(12) United States Patent  
Kaphengst et al.

(10) Patent No.: US 9,994,091 B2  
(45) Date of Patent: Jun. 12, 2018

(54) WINDOW SYSTEM FOR A PASSENGER COMPARTMENT OF A VEHICLE

(71) Applicant: GM GLOBAL TECHNOLOGY OPERATIONS LLC, Detroit, MI (US)

(72) Inventors: Michael R. Kaphengst, Leonard, MI (US); Jamie L. Hamilton, Clinton Township, MI (US); Michael P. Van De Velde, Shelby Township, MI (US); Lara Jane S. Hadlocon, Sterling Heights, MI (US); Breitner S. Marczewski, Shelby Township, MI (US); Dorel M. Sala, Troy, MI (US); Ramona L. Winarski, Rochester Hills, MI (US); Anthony J. Stefanski, Utica, MI (US); Kyle Greene, Kitchener (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/235,704

(22) Filed: Aug. 12, 2016

(65) Prior Publication Data

US 2018/0043756 A1  Feb. 15, 2018

(51) Int. Cl.
| | |
|---|---|
| *G02F 1/15* | (2006.01) |
| *G02F 1/153* | (2006.01) |
| *B60J 3/04* | (2006.01) |
| *G02F 1/163* | (2006.01) |
| *G02F 1/133* | (2006.01) |

(52) U.S. Cl.
CPC .......... *B60J 3/04* (2013.01); *G02F 1/13318* (2013.01); *G02F 1/163* (2013.01)

(58) Field of Classification Search
CPC .... G02F 1/15; G02F 1/163; G02F 2001/1512; G02F 2001/1536; G02F 2001/1552; G02F 2001/1555; G02F 2001/1557
USPC .................................... 359/265–275
See application file for complete search history.

(56) References Cited

U.S. PATENT DOCUMENTS

| | | | |
|---|---|---|---|
| 5,148,014 A * | 9/1992 | Lynam .................... | B60R 1/088 250/214 AL |
| 8,830,141 B2 | 9/2014 | Seder et al. | |
| 2002/0012156 A1* | 1/2002 | Varaprasad ............. | B32B 17/06 359/273 |
| 2009/0027759 A1* | 1/2009 | Albahri ...................... | B60J 3/04 359/277 |

* cited by examiner

*Primary Examiner* — William Choi
(74) *Attorney, Agent, or Firm* — Quinn IP Law

(57) ABSTRACT

A window system for a passenger compartment of a vehicle includes a window including an inner transparent layer, an outer transparent layer and a pixelated layer interposed therebetween. The pixelated layer includes a two-dimensional array of electrochromic cells and an electrode array that is electrically connected to the electrochromic cells. A controller determines, via an incident light monitoring subsystem, a field of view of a passenger and determines an intensity of incident light in relation to the field of view of the passenger. The controller is disposed to command a passenger compartment incident light management subsystem to activate selected electrochromic cells in the transparent window based upon the intensity of the incident light in relation to the field of view of the passenger.

12 Claims, 3 Drawing Sheets

WINDOW SYSTEM FOR A PASSENGER COMPARTMENT OF A VEHICLE

TECHNICAL FIELD

This disclosure relates to vehicle windows, and light transmission therethrough.

BACKGROUND

Vehicles include passenger compartments that include windows that are formed from glass or other suitable substances. Windows function as impermeable transparent windscreens to separate passengers from the elements during operation. Incident light from the sun or external sources such as headlamps of on-coming vehicles may cause glare and otherwise impair vision of the driver. Incident light induces a heat load on the passenger compartment that may be advantageous at cold ambient temperatures and disadvantageous at warm ambient temperatures. Vehicles are presently equipped with manual or semi-automatic sun visors to block or otherwise minimize transmission of incident light into a portion of a passenger compartment. Such devices can completely obstruct vision and do not provide automatic or complete sun blocking coverage at all positions or orientations in the passenger compartment.

SUMMARY

A window system for a passenger compartment of a vehicle is described, and includes a transparent window including an inner transparent layer, an outer transparent layer and a pixelated layer. The pixelated layer includes a two-dimensional array of electrochromic cells and an electrode array that is electrically connected to the electrochromic cells. A passenger compartment incident light management subsystem is electrically connected to the pixelated layer via the electrode array and is disposed to individually activate and deactivate the electrochromic cells. An incident light monitoring subsystem is disposed to monitor incident light transmitted through the window into the passenger compartment, monitor a spatial location of a passenger in the passenger compartment, and determine an intensity of the incident light relative to a field of view of the passenger. A controller is in communication with the incident light monitoring subsystem and the incident light management subsystem, and includes an instruction set that is executable to determine, via the incident light monitoring subsystem, a field of view of the passenger of the vehicle and determine the intensity of incident light in relation to the field of view of the passenger. The controller is disposed to command the passenger compartment incident light management subsystem to activate selected electrochromic cells in the transparent window based upon the intensity of the incident light in relation to the field of view of the passenger.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, inner, outer, rear and front may be used with respect to the drawings. These and similar directional terms descriptive in nature and are not to be construed to limit the scope of the disclosure in any manner. Furthermore, the teachings may be described herein in terms of functional and/or logical block components and/or various processing steps. It should be realized that such block components may be composed of any number of hardware, software, and/or firmware components configured to perform the specified functions. Furthermore, the disclosure, as illustrated and described herein, may be practiced in the absence of any element which is not specifically disclosed herein.

Figure 1:
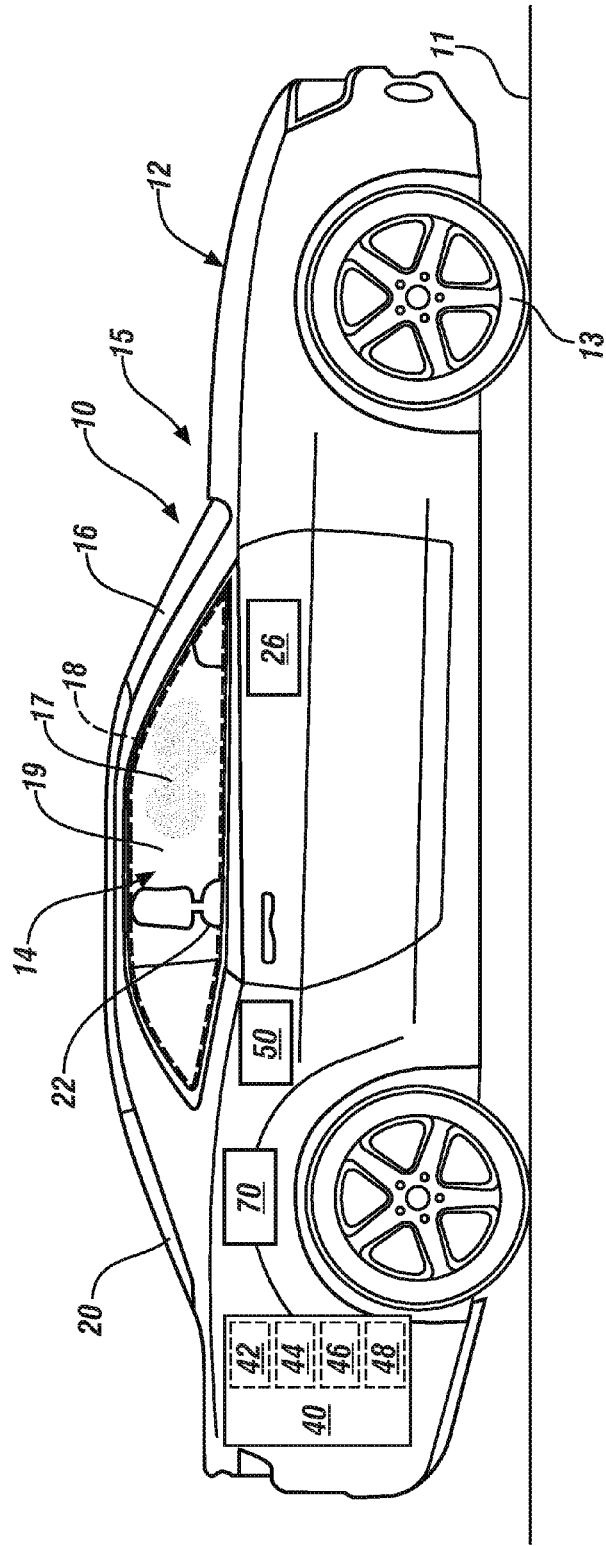
FIG. 1 schematically illustrates a vehicle that includes a vehicle body having a plurality of windows that are disposed to envelop a passenger compartment, an incident light monitoring subsystem, and an incident light management subsystem, in accordance with the disclosure.

Referring to the drawings, wherein like reference numerals correspond to like or similar components throughout the several Figures, FIG. 1, consistent with embodiments disclosed herein, illustrates a side schematic view of a vehicle 10 that is positioned relative to a road surface 11. The vehicle 10 includes a vehicle body 12, a passenger compartment 14 having a plurality of windows 15, a controller 50, an incident light monitoring subsystem 40 and a passenger compartment incident light management subsystem (LMS) 70. The windows 15 are disposed around an outer periphery of the passenger compartment 14. The windows 15 may include, by way of non-limiting examples, a windshield 16, side windows including a front passenger window 19 and a front driver window 18, a rear window 20 and windows on the roof of the vehicle 10 (not shown). The windows 15 may also include left and right rear passenger windows and intermediate windows in some embodiments (not shown). Each of the windows 15 is preferably fabricated from some form of transparent material, such as tempered glass or laminated glass. Each of the windows 15 has a pixelated layer 17, which is described in detail with reference to FIG. 3.

The vehicle body 12 defines six body sides, including a front end, a rear end, a left side, a right side, a top portion that may include a vehicle roof, and an underbody portion. The passenger compartment 14 is contained within the vehicle body 12 and includes one or more passenger seats, including a driver seat 22. Some vehicles may also include a front passenger seat, middle row passenger seat(s), rear passenger seat(s), and/or another suitably arranged seat, depending upon the configuration of the passenger compartment 14.

The vehicle 10 preferably includes a drivetrain that includes a power plant that mechanically couples via a geartrain and driveline to one or a plurality of wheels 13 to transfer mechanical power to the road surface 11 to effect tractive effort. The power plant may include, by way of non-limiting examples, an internal combustion engine, a hybrid-electric powertrain, an electrically-powered motor, or another alternative type of power plant. The geartrain may include an automatic transmission rotatably coupled to a differential or transaxle, or another suitable geartrain configuration. The vehicle 10 may include, but not be limited to a mobile platform in the form of a commercial vehicle, an industrial vehicle, an agricultural vehicle, a passenger vehicle, various forms of autonomous vehicles, an aircraft, a watercraft, a train, an all-terrain vehicle, a personal movement apparatus, a robot and the like to accomplish the purposes of this disclosure. Operation of the vehicle 10 may be controlled by the controller 50.

The incident light monitoring subsystem 40 includes a light monitoring controller 42 and a plurality of sensors, control routines, calibrations and other elements that are configured to monitor and characterize incident light that transmits through one or more of the windows 15 into the passenger compartment 14 and also to determine a field of view (FOV) of each of the passengers in the passenger compartment 14. The FOV defines the extent of the observable world that may be seen at a point in time. The incident light monitoring subsystem 40 determines an intensity of the incident light relative to the FOV for each of the passengers. These operations are dynamically executed in the light monitoring controller 42 to provide real-time information.

The light monitoring controller 42 includes information that is stored in a non-volatile memory device that is geometrically descriptive of the vehicle architecture as it relates to the passenger compartment 14. Such information preferably includes a three-dimensional description of the passenger compartment 14 including a shape and form of the windshield 16, the side windows including, e.g., the front passenger window 19 and the front driver window 18, and the rear window 20. In one embodiment, the three-dimensional description of the passenger compartment 14 is described in relation to the road surface 11, with longitudinal, lateral and elevation axes defined thereby.

The incident light monitoring subsystem 40 may include an occupant sensing subsystem 44 that is disposed to monitor spatial orientation of each passenger of the vehicle 10, including detecting and monitoring position(s) of a driver and occupants of other vehicle seats. Such sensing subsystems may include seat sensors for detecting occupancy and seat position, memory seats and associated controls, seatbelt use sensors, seat track travel sensors, and in-vehicle camera subsystems. Such sensors and associated control routines may be employed to characterize seat position and spatial orientation of each passenger employing linear, angular and/or multi-axis sensing configurations.

The incident light monitoring subsystem 40 may include a vehicle sensing subsystem 46 that is disposed to monitor spatial orientation of the vehicle 10. The vehicle sensing subsystem 46 may include, or be in communication with an on-vehicle global positioning system (GPS), which may be interrogated to determine direction of vehicle travel and vehicle elevation. The vehicle sensing subsystem 46 may include, or be in communication with an on-vehicle vehicle dynamics subsystem that includes gyroscopic sensors, accelerometers and other devices that may be employed to determine vehicle speed (or zero speed) and acceleration, and vehicle attitude including yaw, pitch and roll.

The incident light monitoring subsystem 40 may include an incident light sensing subsystem 48 that is disposed to monitor orientation and intensity of incident light in relation to the vehicle 10. The incident light sensing subsystem 48 may include devices, control routines and predetermined calibrations indicating the position of the sun relative to the horizon for the vehicle location in relation to the date and time of day. The incident light sensing subsystem 48 may include devices and systems for monitoring weather conditions, including ambient temperature, presence of snow and other glare-producing conditions. The incident light sensing subsystem 48 may include a headlamp monitoring system that is disposed to monitor intensity of headlamps of an oncoming vehicle. The incident light sensing subsystem 48 may include other devices that are configured to monitor intensity of light that is generated from a stationary light source, such as a street lamp. The incident light sensing subsystem 48 may include a photometric sensor for monitoring intensity of the incident light that transmits through one of the windows 15 into the passenger compartment 14. Photometric sensors may include devices and systems for monitoring light in the visual spectrum, and may include, in one embodiment, a filtered silicon photodiode device that generates a signal that relates to luminance (in units of $cd/m^2$), illuminance (in units of lux), luminous intensity (in units of cd), or another suitable measurement system.

The incident light monitoring subsystem 40 employs three-dimensional spatial geometric relationships, which are dynamically executed in the light monitoring controller 42, to determine the intensity of incident light relative to the FOV of each of the passengers based upon information from the occupant sensing subsystem 44, the vehicle sensing subsystem 46 and the incident light sensing subsystem 48. Development and implementation of spatial geometric relationships are known to those skilled in the art, and thus not described in further detail herein.

The vehicle 10 may also include a user interface 26, which allows the driver or another passenger to interact with the controller 50 to adjust or manually control the LMS 70. While one user interface 26 is shown, the term "user interface" can include, but is not limited to, a touch screen, a physical keyboard, a mouse, knob(s), toggle switch(es), a microphone, and/or a speaker. In one embodiment, the touch screen is responsive to tactile inputs from a user, including but not limited to pointing, tapping, dragging, two-finger pinching, two-finger expanding, etc. The user interface 26 may be employed by one of the passengers to provide a control input to the LMS 70 to control operation thereof.

Figure 2:
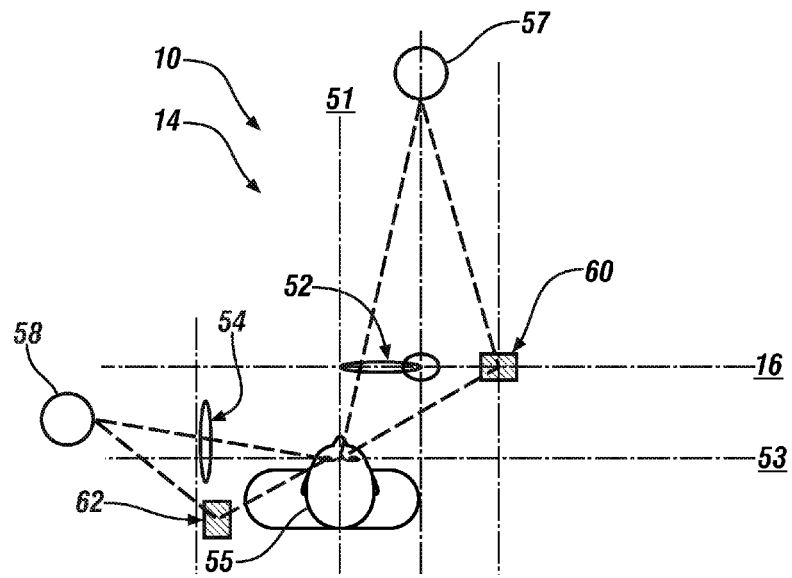
FIG. 2 schematically illustrates a top-view of a portion of the passenger compartment of the vehicle, including a windshield, a vehicle driver, and in-vehicle camera, in accordance with the disclosure.

FIG. 2 schematically illustrates a top-view of a portion of the passenger compartment 14 of the vehicle 10 including windshield 16 to further describe elements related to the incident light monitoring subsystem 40. A vertical axis 51 that is collinear with a longitudinal axis of the vehicle 10 and a horizontal axis 53 that is collinear with a lateral axis of the vehicle 10 are indicated. A vehicle driver 55 is indicated. The vehicle 10 includes an in-vehicle camera 60 that is mounted near the windshield 16, such as on a rearview mirror (not shown). Another photo-sensing device 62 may be employed, and may be mounted in the passenger compartment 14 at another location. The in-vehicle camera 60 and the photo-sensing device 62, when employed, are mounted in locations in the passenger compartment 14 that are suitable for detecting and monitoring one or more external light sources and the FOV of the passengers including the driver 55 and other passengers. A primary external light source 57, such as a sun, and a shade element 52 are indicated in relation to the vehicle driver 55, or alternatively in relation to another passenger (not shown). Under certain circumstances, there may be a secondary external light source 58 that enters the FOV of the vehicle driver 55, and an associated second shade element 54. The secondary external light source 58 may be a reflection of the primary external light source 57, or may originate from a second source. The in-vehicle camera 60 is preferably a digital device that includes an image acquisition sensor, an encoder, and a camera controller. The camera 60 is capable of capturing digitized images representing the FOV at a predetermined resolution. The image acquisition sensor of the camera 60 communicates with the encoder that communicates with the camera controller, which executes digital signal processing (DSP) on the digitized images. The camera 60 is fixedly mounted in the passenger compartment 14, and has a frame of reference in the form of an xyz-coordinate system having a point of origin associated with the camera 60, with the x and y coordinates defined by the vehicle 10 and the road surface 11, and the z coordinate orthogonal thereto. The camera controller includes executable routines that enable it to identify a location of an external light source, e.g., in context of the incident light transmitting through the windshield 16 based upon the digitized images generated by the camera 60. The camera controller may also include executable routines that enable it to identify the location and associated FOV of the driver 55 by employing pattern recognition routines and light detection routines based upon the digitized images generated by the camera 60. The camera 60 and the photo-sensing device 62 communicate with the light monitoring controller 42.

Referring again to FIG. 1, the passenger compartment incident light management subsystem (LMS) 70 is configured to interact with the window 15 to modulate the transparency of the window 15. As described with reference to FIG. 3, the LMS 70 is controllable to modulate transparency of one or more spatially-defined subsections of one of the windows 15, wherein the transparency may be modulated to reduce the intensity of the incident light transmitting through the window 15 in relation to the FOV of the passenger, as determined by the incident light monitoring subsystem 40. This includes reducing the transparency to reduce the intensity of the incident light that is transmitted through the window 15 that is in the FOV of one or more of the passengers, with preferential treatment afforded to the driver 55 to reduce, minimize or eliminate visual impairment.

Figure 3:
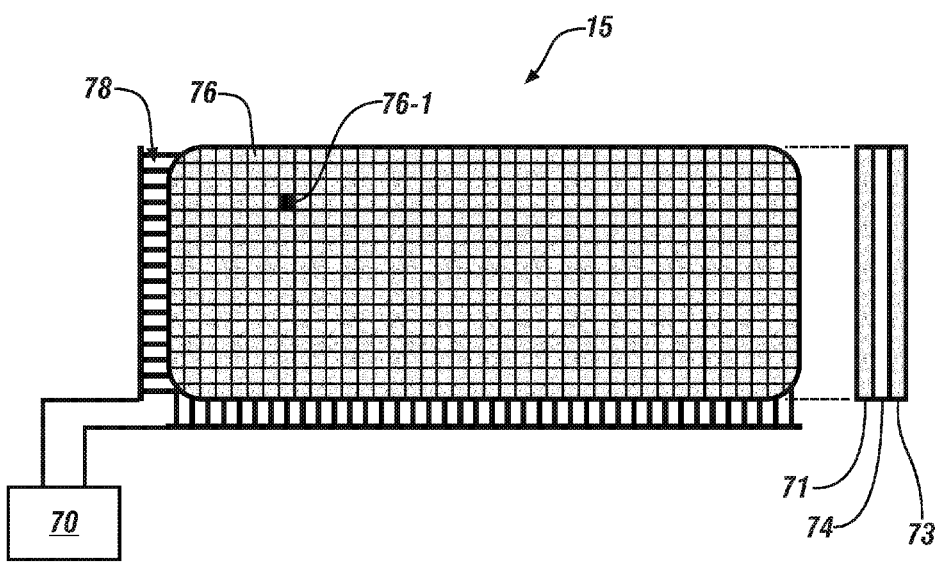
FIG. 3 schematically shows a plan view and an associated side view of one embodiment of one of the windows and the associated window controller, in accordance with the disclosure.

FIG. 3 schematically shows a plan view and an associated side view of one embodiment of one of the windows 15 and the associated LMS 70. The window 15 includes an inner transparent layer 71, an outer transparent layer 73 and a pixelated layer 74, which is analogous to the pixelated layer 17 that is shown with reference to FIG. 1. In one embodiment, the pixelated layer 74 is interposed between the inner transparent layer 71 and the outer transparent layer 73. Alternatively, the pixelated layer 74 fabricated onto an inner surface of the inner transparent layer 71. The pixelated layer 74 includes a two-dimensional array composed of a plurality of electrochromic cells 76, a single one of which is indicated. A two-dimensional electrode array 78 is formed that is electrically connected to each of the electrochromic cells 76. The LMS 70 is electrically connected to the pixelated layer 74 via input/output circuits that are electrically connected to the electrode array 78. The LMS 70 includes control routines that selectively control electric power to individual leads in the electrode array 78 to activate and deactivate the selected ones of the electrochromic cells 76.

The electrochromic cells 76 preferably employ a material that exhibits a reversible electrochemically-mediated change in an optical property in response to an electrical state, such as in response to an applied voltage. Optical properties can including color, transmittance, absorbance and reflectance. One example of an electrochromic material is tungsten oxide (WO3), which is a cathodic electrochromic material in which a coloration transition occurs by electrochromic reduction, wherein the electrochromic material is transparent to blue when deactivated, and undergoes a coloration transition to generate a blue tint in response to an applied voltage. The applied voltage may be variable, wherein the magnitude of the coloration that generates a blue tint increases with increased voltage. Another example of an electrically switchable material is Polymer Dispersed Liquid Crystal (PDLC) in which the orientation of liquid crystals (LC) change with an applied voltage thus becoming more or less transparent. In general PLDC are opaque (random orientation of LC) when not energized and transparent when energized.

The LMS 70 includes executable control routines, calibrations and other elements to individually control the plurality of electrochromic cells 76. Each of the plurality of electrochromic cells 76 can increase their coloration, i.e., darken their tint in response to the applied voltage, rendering them increasingly translucent or opaque.

As shown with reference to FIG. 3, a single one of the electrochromic cells 76, indicated by numeral 76-1, is activated and thus exhibits increased coloration to reduce transparency of the window 15 within a subsection that is spatially defined by the area of the electrochromic cell 76. Other activation schemes may include activating a plurality of the electrochromic cells 76 to reduce transparency of the window 15 within a spatially-defined subsection that is a horizontal band on the window 15. This may also include activating a first plurality of the electrochromic cells 76 with a first level of applied voltage to reduce transparency of the window 15 by a first amount within a first spatially-defined subsection that is a first horizontal band on the window 15, and activating a second plurality of the electrochromic cells 76 with a second level of applied voltage to reduce transparency of the window 15 by a second amount within a second spatially-defined subsection that is a second horizontal band on the window 15 that is adjacent to the first horizontal band on the window 15. This may also include activating a defined plurality of the electrochromic cells 76 to reduce transparency of the window 15 within a spatially-defined subsection on the window 15. Furthermore, the LMS 70 may individually activate and deactivate the electrochromic cells of one of the windows 15 to reduce the transparency of a spatially-defined subsection of the window 15, wherein the spatially-defined subsection of the window 15 is associated with a graphical display that is composed of alphanumeric characters or symbols, in order to communicate information to one or more passengers. This may include a heads-up display or HUD for communicating vehicle operating information to the driver, or may include a message that may be read by another of the passengers.

The modulated or reduced transparency and associated reduced light transmittance reduces intensity of glare and likelihood of impaired vision that may be caused by an external light source. The reduced transparency may be dynamically controlled, and can be localized to a specific one of the electrochromic cells 76, localized to an entire area of a selected one of the windows 15, or may encompass selected electrochromic cells 76 of all of the windows 15 of the vehicle.

Referring again to FIG. 1, with continued reference to FIGS. 2 and 3, the controller 50 monitors inputs from the incident light monitoring subsystem 40 to determine an intensity of the incident light relative to a field of view of the passenger and determines, via the monitoring system, the intensity of incident light in relation to the field of view of the passenger. The controller 50 operates to control the LMS 70 to reduce the transparency of one or a plurality of the electrochromic cells 76 of the window 15 based upon the intensity of the incident light in relation to the field of view of the passenger.

Figure 4:
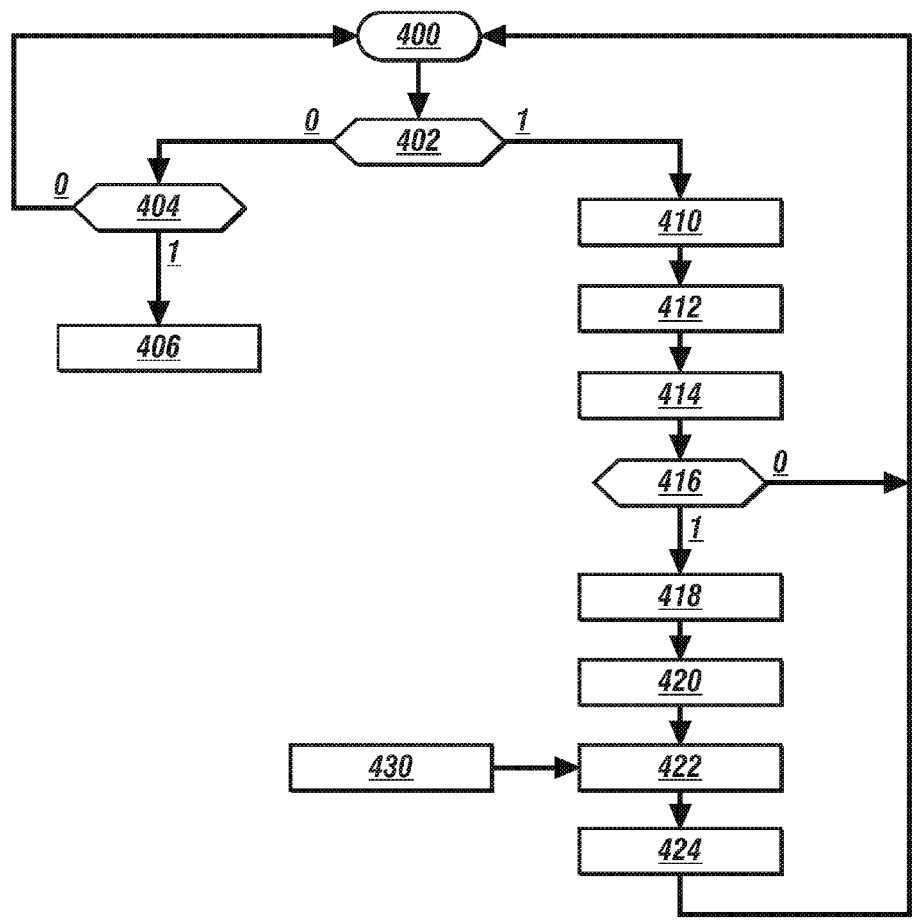
FIG. 4 shows a functional block diagram of a control routine that may be executed by the controller to control operation of the window controller of the vehicle, in accordance with the disclosure.

FIG. 4 shows a functional block diagram of a control routine 400 that may be executed by the controller 50 to control operation of the LMS 70 of the vehicle 10. The control routine 400 preferably periodically executes during vehicle operation and when the vehicle is not operating. When the vehicle 10 is not operating (402)(0), it determines whether there is an occupant in the vehicle (404), wherein presence of an occupant may be sensed by the incident light monitoring subsystem 40. When there are no occupants (404)(0), the LMS 70 is activated to achieve a preferred tinting level associated with a parked car, which may be a maximum darkened tinting level to minimize visibility into the passenger compartment 14 (406). When there are occupants in the vehicle (404)(0), the LMS 70 may be activated to a default level of tinting, e.g., no tinting or completely transparent, or to a level of tinting that is controllable by the driver or another passenger.

When the vehicle 10 is operating (402)(1), incident light monitoring subsystem 40 determines a vehicle location, e.g., via a GPS system (410), determines a position of the sun (412), and uses information therefrom to determine which of the window(s) 15 is affected by the solar load, and activates the LMS 70 for that window(s) 15. The intensity of the incident light is evaluated (414), and compared to a threshold intensity (416), wherein the threshold intensity may be a default level, or may be set by the driver or another passenger.

When the intensity of the incident light is less than the threshold intensity (416)(0), no further action is taken. When the intensity of the incident light is greater than the threshold intensity (416)(1), the incident light monitoring subsystem 40 determines a head position of the driver and other passengers to determine their FOV (418), and determines a position and shape of a spatially-defined subsection of the window 15 that is associated with the incident light in relation to the FOV of the driver and other passengers (420). A preferred degree of coloration is determined (422), which may be based upon a baseline or nominal coloration (430), and the LMS 70 is commanded to activate the electrochromic cells 76 associated with the spatially-defined subsection of the window 15 that is associated with the incident light in relation to the FOV of the driver and other passengers (424). The electrochromic cells 76 are controlled to increase their coloration, i.e., darken their tint in response to the applied voltage, rendering them increasingly translucent or opaque. Other activation schemes may include activating a plurality of the electrochromic cells 76 to reduce transparency of the window 15 within a spatially-defined subsection that is a horizontal band on the window 15.

In addition to relieving visual impairment caused by the sun or oncoming glare from external light sources, other benefits that may accrue to a vehicle operator include the ability to eliminate manual sun visors, rear shades, and other components.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A window system for a passenger compartment of a vehicle, comprising:
   a plurality of windows, each including a transparent layer and a pixelated layer, wherein the pixelated layer includes a two-dimensional array of electrochromic cells and an electrode array electrically connected to the electrochromic cells;
   an incident light monitoring subsystem being disposed to monitor incident light transmitted through the plurality of windows into the passenger compartment, being disposed to monitor spatial locations of passengers in the passenger compartment, and being disposed to determine intensity of the incident light relative to fields of view of the passengers;
   an incident light management subsystem that is electrically connected to the pixelated layer via the electrode array and is disposed to individually activate and deactivate the electrochromic cells of each of the plurality of windows to reduce transparency thereof; and
   a controller, in communication with the monitoring subsystem and the incident light management subsystem, the controller including an instruction set that is executable to:
      determine, via the incident light monitoring subsystem, the fields of view of the passengers of the vehicle,
      determine, via the incident light monitoring subsystem, the intensity of incident light in relation to the fields of view of the passengers, and
      control the incident light management subsystem to control one or more of the windows to reduce the transparency based upon the intensity of the incident light in relation to the fields of view of the passengers.

2. The window system of claim 1, wherein the incident light monitoring subsystem includes a photometric sensor.

3. The window system of claim 1, wherein the incident light monitoring subsystem includes a digital camera.

4. The window system of claim 1, wherein the window comprises a windshield.

5. The window system of claim 1, wherein the window comprises one of a side window or a rear window.

6. The window system of claim 1, wherein the passenger comprises a vehicle driver.

7. The window system of claim 1, wherein the pixelated layer is interposed between the inner transparent layer and the outer transparent layer of the window.

8. The window system of claim 1, wherein the pixelated layer is fabricated onto an inner surface of the inner transparent layer of the window.

9. The window system of claim 1, wherein each of the electrochromic cells comprises a material that is disposed to change its transparency in response to an applied electrical signal, wherein the change in transparency correlates to the applied electrical signal.

10. The window system of claim 1, wherein the passenger compartment incident light management subsystem is disposed to individually activate and deactivate the electrochromic cells of each of the windows to reduce the transparency of a spatially-defined subsection of the window that is defined by pixels of the pixelated layer.

11. The window system of claim 10, further comprising the passenger compartment incident light management subsystem disposed to individually activate and deactivate the electrochromic cells of one of the windows to reduce the transparency of a spatially-defined subsection of the window, wherein the spatially-defined subsection of the window is associated with a graphical display that is composed of alphanumeric characters or symbols.

12. The window system of claim 1, further comprising the controller including an instruction set that is executable to:
   determine whether the vehicle is operating,
   determine whether there is an occupant in the vehicle, and
   control the incident light management subsystem to minimize visibility into the passenger compartment when the vehicle is not operating and there is no occupant in the vehicle.

* * * * *